(12) United States Patent
Kinlen et al.

(10) Patent No.: US 12,503,776 B2
(45) Date of Patent: *Dec. 23, 2025

(54) CORROSION RESISTANT COATING SYSTEMS

(71) Applicant: THE BOEING COMPANY, Arlington, VA (US)

(72) Inventors: Patrick J. Kinlen, Fenton, MO (US); Anthony E. Dillard, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,107

(22) Filed: Mar. 14, 2024

(65) Prior Publication Data

US 2024/0218523 A1 Jul. 4, 2024

Related U.S. Application Data

(62) Division of application No. 17/463,056, filed on Aug. 31, 2021, now Pat. No. 11,932,949.

(51) Int. Cl.
*C23F 11/12* (2006.01)
*C09D 5/00* (2006.01)
(Continued)

(52) U.S. Cl.
CPC ........... *C23F 11/161* (2013.01); *C09D 5/002* (2013.01); *C09D 5/086* (2013.01); *C09D 183/04* (2013.01);
(Continued)

(58) Field of Classification Search
CPC ......... B05D 1/02; B05D 1/18; B05D 3/0254; B05D 3/107; B05D 7/50; C23F 11/00;
(Continued)

(56) References Cited

U.S. PATENT DOCUMENTS 5,183,590 A * 2/1993 Carter ................. C23F 11/163
562/490
7,601,425 B2 * 10/2009 Stoffer ................. C09D 5/084
428/416

(Continued)

FOREIGN PATENT DOCUMENTS

CA 3007146 A1 * 12/2018 ............ B01J 13/003
EP 3272904 A2 * 1/2018 ............... B05D 3/06
(Continued)

OTHER PUBLICATIONS

Vignesh Palanivel, Y. Huang, Wim J. van Ooij, Effects of addition of corrosion inhibitors to silane films on the performance of AA2024-T3 in a 0.5M NaCl solution, Year: 2005, pp. 1-2 [Abstract Only].

(Continued)

*Primary Examiner* — Brian K Talbot
(74) *Attorney, Agent, or Firm* — Yee & Associates, P.C.

(57) ABSTRACT

Aspects described herein generally relate to a method of coating a metallic surface. The method includes forming a solution including a corrosion inhibitor having one or more thiol moieties and a hydroxide. The metallic surface is coated with the solution to form a treated metallic surface. The treated metallic surface is further coated with an organosilane, an acid, and a metal alkoxide to form a coating system.

17 Claims, 3 Drawing Sheets

(51) Int. Cl.
*C09D 5/08* (2006.01)
*C09D 183/04* (2006.01)
*C23F 11/04* (2006.01)
*C23F 11/16* (2006.01)
*B05D 1/02* (2006.01)
*B05D 1/18* (2006.01)
*B05D 3/02* (2006.01)
*B05D 3/10* (2006.01)
*B05D 7/00* (2006.01)

(52) U.S. Cl.
CPC .............. *C23F 11/04* (2013.01); *C23F 11/12* (2013.01); *B05D 1/02* (2013.01); *B05D 1/18* (2013.01); *B05D 3/0254* (2013.01); *B05D 3/107* (2013.01); *B05D 7/50* (2013.01)

(58) Field of Classification Search
CPC ......... C23F 11/04; C23F 11/12; C23F 11/161; C09D 5/086; C09D 183/04
USPC ........................................................ 427/419.5
See application file for complete search history.

(56) References Cited

U.S. PATENT DOCUMENTS

| | | | |
|---|---|---|---|
| 7,615,257 B2 | 11/2009 | Jung et al. | |
| 7,935,181 B2 | 5/2011 | Hayes et al. | |
| 9,982,141 B2 * | 5/2018 | Ui | C23C 28/34 |
| 10,167,394 B2 | 1/2019 | Kinlen et al. | |
| 10,508,203 B2 | 12/2019 | Kinlen et al. | |
| 10,508,205 B2 | 12/2019 | Schuette et al. | |
| 10,738,199 B2 | 8/2020 | Ijeri et al. | |
| 10,926,237 B2 | 2/2021 | Schuette et al. | |
| 11,560,505 B2 * | 1/2023 | Yang | C23F 11/126 |
| 11,932,949 B2 | 3/2024 | Kinlen et al. | |
| 2003/0027011 A1 | 2/2003 | Kotov et al. | |
| 2008/0111027 A1 | 5/2008 | Blohowiak et al. | |
| 2013/0000372 A1 | 1/2013 | Krech et al. | |
| 2013/0052352 A1 | 2/2013 | Cano-Iranzo et al. | |
| 2016/0145443 A1 | 5/2016 | Kinlen et al. | |
| 2016/0273111 A1 | 9/2016 | Morris | |
| 2018/0022938 A1 | 1/2018 | Ijeri et al. | |
| 2018/0087162 A1 | 3/2018 | Kinlen et al. | |
| 2019/0002705 A1 * | 1/2019 | Moore | C23C 22/73 |
| 2019/0002739 A1 * | 1/2019 | Moore | C23C 18/1254 |
| 2019/0211214 A1 | 7/2019 | Ijeri et al. | |
| 2019/0240635 A1 | 8/2019 | Schuette et al. | |
| 2019/0241752 A1 | 8/2019 | Schuette et al. | |
| 2020/0115561 A1 | 4/2020 | Schuette et al. | |

FOREIGN PATENT DOCUMENTS

| | | |
|---|---|---|
| EP | 3299491 A2 | 3/2018 |
| EP | 3421562 A1 | 1/2019 |
| EP | 3421564 A1 | 1/2019 |
| EP | 3480340 A1 | 5/2019 |
| EP | 3620496 A1 | 3/2020 |

OTHER PUBLICATIONS

European Patent Office, Extended European Search Report for Application 22191528.3-1108 / 4141143 dated Feb. 1, 2023.

* cited by examiner

300

302 — FORMING A SOLUTION COMPRISING A CORROSION INHIBITOR HAVING ONE OR MORE THIOL MOIETIES AND A HYDROXIDE

302A — COMBINING THE CORROSION INHIBITOR, THE HYDROXIDE, THE ACID, AND THE METAL ALKOXIDE

302B — COATING THE METALLIC SURFACE WITH THE SOLUTION

304 — COATING THE METALLIC SURFACE WITH THE SOLUTION, AN ACID, AND A METAL ALKOXIDE TO FORM A TREATED METALLIC SURFACE

304A — APPLYING THE SOLUTION OVER THE METALLIC SURFACE

304B — APPLYING AN ACID AND A METAL ALKOXIDE AFTER APPLYING THE SOLUTION

306 — COATING THE TREATED METALLIC SURFACE WITH A COATING COMPRISING AN ORGANOSILANE.

308 — CURING THE COATING COMPRISING THE ORGANOSILANE TO FORM A COATING SYSTEM

FIG. 3

CORROSION RESISTANT COATING SYSTEMS

CROSS-REFERENCE TO RELATED APPLICATIONS

This application is a divisional of pending U.S. patent application Ser. No. 17/463,056, filed Aug. 31, 2021, issued as U.S. Pat. No. 11,932,949 on Mar. 19, 2024. The above-referenced application is incorporated herein by reference in its entirety.

FIELD

Aspects of the present disclosure generally relate to corrosion resistant sol-gel films.

BACKGROUND

Aircraft surfaces are typically made of a metal, such as aluminum or titanium. A primer can be coated on the metal surface to prevent or reduce corrosion. However, because primers do not adequately adhere to the metal surfaces, adhesive coatings are typically disposed between a metal surface and a primer to promote adhesion between the metal and the primer.

An adhesive sol-gel film may be disposed at the interface between the metal and primer. After extended use of the aircraft surface, pores may form within a sol-gel film. The pores retain water over time, which promotes corrosion of the metal surface and reduces the adhesive properties of the sol-gel. Typical sol-gel films do not inherently possess corrosion resistance properties. Furthermore, the presence of water within the pores is subject to an increase of osmotic pressure within the pore which creates a visually noticeable defect in the aircraft surface known as a "blister", which also reduces the adhesive properties of the sol-gel.

Corrosion protection of aircraft metal surfaces has typically relied on primers having hexavalent chromium. However, there is regulatory pressure to eliminate the use of hexavalent chromium from primers and pretreatments. Furthermore, corrosion inhibitors have been added to sol-gel films (or included in the formation of the sol-gel film), but these inhibitors have been found to decrease both the adhesive ability of the sol-gel film and anticorrosion ability of the corrosion inhibitor when present in the sol-gel film. Corrosion inhibitors are not soluble in sol-gel film and can be dispersed within the sol-gel network. Insoluble, entrained corrosion inhibitor particles can cause osmotic blistering within subsequently applied layers disposed over the sol-gel film.

Therefore, there is a need for new and improved corrosion resistant, adhesive sol-gel films.

SUMMARY

In at least one aspect, a method of coating a metallic surface is provided. The method includes forming a solution including a corrosion inhibitor having one or more thiol moieties and a hydroxide. The metallic surface is coated with the solution to form a treated metallic surface. The treated metallic surface is further coated with an organosilane, an acid, and a metal alkoxide to form a coating system.

In at least one aspect, a method of coating a metallic surface is provided including forming a solution comprising a corrosion inhibitor having one or more thiol moieties and a hydroxide. The metallic surface is coated with the solution, an acid, and a metal alkoxide to form a treated metallic surface. The treated metallic surface is coated with an organosilane to form a coating system.

In at least one aspect, a coating system is provided. The coating system is a reaction product of a salt of a corrosion inhibitor having one or more thiol moieties, an organosilane, an acid, and a metal alkoxide.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

FIG. 3 is a flow chart illustrating a method of forming a coating system, in accordance with some examples of the present disclosure.

Figure 1:
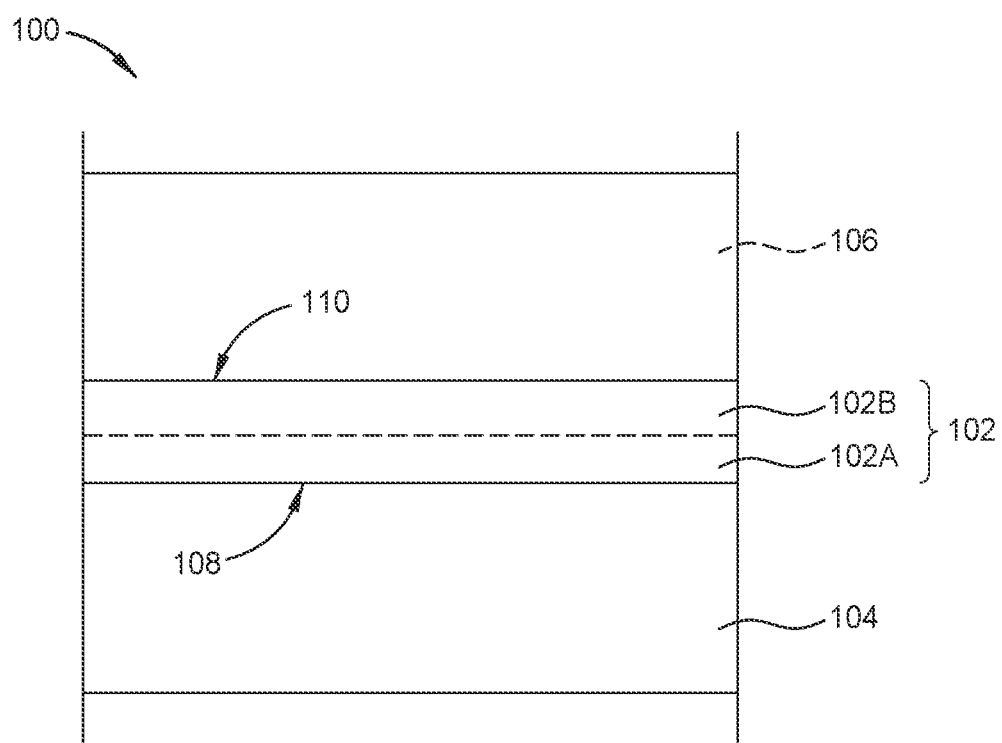
FIG. 1 is a side view of a corrosion-inhibiting sol-gel disposed on a substrate in accordance with an example of the present disclosure.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Aspects of the present disclosure generally relate to corrosion resistant coating systems. Coating systems of the present disclosure include (or are the reaction product of) a salt of a corrosion inhibitor having one or more thiol moieties, an organosilane, an acid, and a metal alkoxide. Without being bound by theory, it is believed that solubilizing the corrosion inhibitor by forming a salt of the corrosion inhibitor to use in a coating system reduces porosity relative to coating systems having particulates and prevents blistering of a sol-gel/primer coating on a metal surface during curing. The resulting sol-gel coating is free of particulates or substantially free of particulates (e.g., insoluble corrosion inhibitor) of the corrosion inhibitor, and accumulation of water within the sol-gel is prevented or reduced. The corrosion inhibitor can be solubilized using a hydroxide to form a salt of the corrosion inhibitor and dissolving the corrosion inhibitor in water. The corrosion inhibitor can be combined with water forming a corrosion inhibitor dispersion having a cloudy appearance. The corrosion inhibitor dispersion is solubilized by adding the hydroxide to the dispersion, such as by titration, until a solution having a clear appearance is formed or until reaching a predetermined acidity (e.g., pH). The predetermined acidity can be about 3 pH to about 7 pH, such as about 6 pH to about 7 pH.

The solution produced from solubilizing the corrosion inhibitor is applied to a metallic surface to form a treated metallic surface. The coating may be at least partially cured at ambient temperature (e.g., about 20° C. to about 23° C.)

or can be heated to increase the rate of curing. The treated metallic surface can be further coated with an organosilane, an acid, and a metal alkoxide to form a coating system having anticorrosion properties. The coating system forms a sol-gel film over the metallic surface.

Furthermore, a molar ratio of acid to metal alkoxide of the coating system is about 1:1 or greater, such as about 2:1 or greater, which provides a pH of the sol-gel from about 3 to about 5, which does not hinder (1) sol-gel formation, (2) adhesive ability of the sol-gel film, or (3) anticorrosion ability of the corrosion inhibitor.

Sol-Gels

The term "sol-gel," a contraction of solution-gelation, refers to a series of reactions wherein a soluble metal species (typically a metal alkoxide or metal salt) hydrolyze to form a metal hydroxide. The soluble metal species usually contain organic ligands tailored to correspond with the resin in the bonded structure. A soluble metal species undergoes heterohydrolysis and heterocondensation forming heterometal bonds, e.g. Si—O—Zr. In the absence of organic acid, when metal alkoxide is added to water, a white precipitate of, for example, $Zr(OH)_2$ rapidly forms. $Zr(OH)_2$ is not soluble in water, which hinders sol-gel formation. The acid added to the metal alkoxide allows a water-based system. Depending on reaction conditions, the metal polymers may condense to colloidal particles or they may grow to form a network gel. The ratio of organics to inorganics in the polymer matrix is controlled to maximize performance for a particular application.

Sol-gels of the present disclosure include (or are the reaction product of) one or more sol-gel components: an organosilane, a metal alkoxide, an acid, and water.

Organosilane: An organosilane of the present disclosure can be represented by Formula (I):

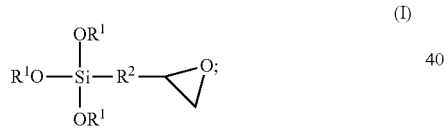

wherein each $R^1$ is independently selected from $C_1$-$C_{20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl;

$R^2$ is selected from alkyl, cycloalkyl, ether, and aryl.

Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether. In at least one aspect, ether is selected from:

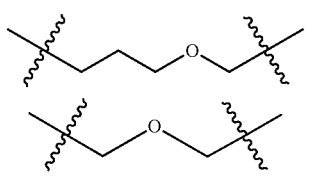

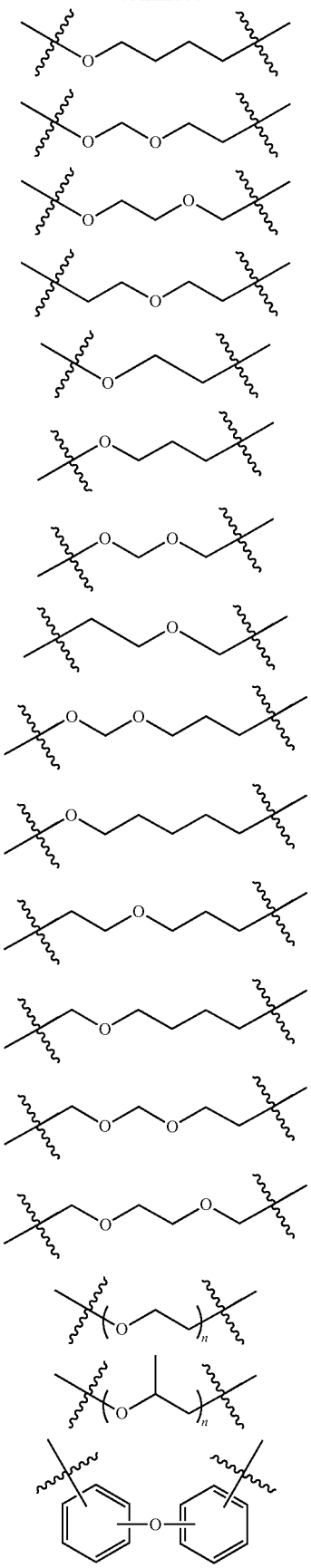

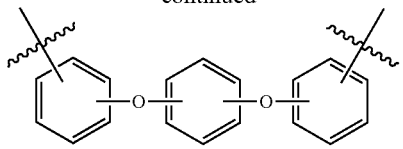

n is a positive integer. In at least one aspect, n is a positive integer and the number average molecular weight (Mn) of the ether is from about 300 to about 500, such as from about 375 to about 450, such as from about 400 to about 425.

In at least one aspect, an organosilane is (3-glycidyloxypropyl)trimethoxysilane (GTMS), (3-glycidyloxypropyl)triethoxysilane, or (3-glycidyloxypropyl)tripropoxysilane.

The sol-gel of the present disclosure can include reactive silanes, trialkoxysilyl compounds, which form stable condensation products (gels) with zirconium compounds and provide adhesion to metal surfaces through multiple interfacial bonds. The epoxy functionalities as shown in Formula I provides a reactive bonding site toward epoxy or polyurethane substrates or subsequent top coatings.

Hydroxy organosilane: An organosilane of the present disclosure can be a hydroxy organosilane. A hydroxy organosilane useful to form sol-gels of the present disclosure provides reduced porosity and blistering of sol-gels. Hydroxy organosilanes are substantially unreactive toward corrosion inhibitors, unlike the epoxy-containing compound (3-glycidyloxypropyl)trimethoxysilane (GTMS) used for conventional sol-gels, as explained in more detail below. Hydroxy organosilanes of the present disclosure are represented by formula (I):

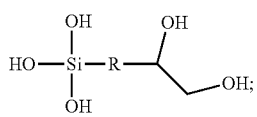

(II)

wherein R is selected from alkyl, cycloalkyl, ether, and aryl. Alkyl includes linear or branches $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_{1-C20}$ alkyl ether, aryl ether, and cycloalkyl ether. In at least one aspect, ether is selected from:

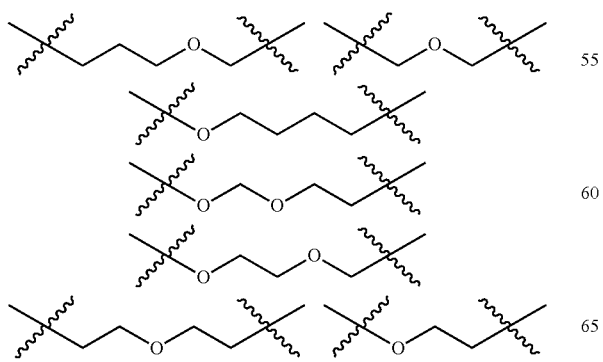

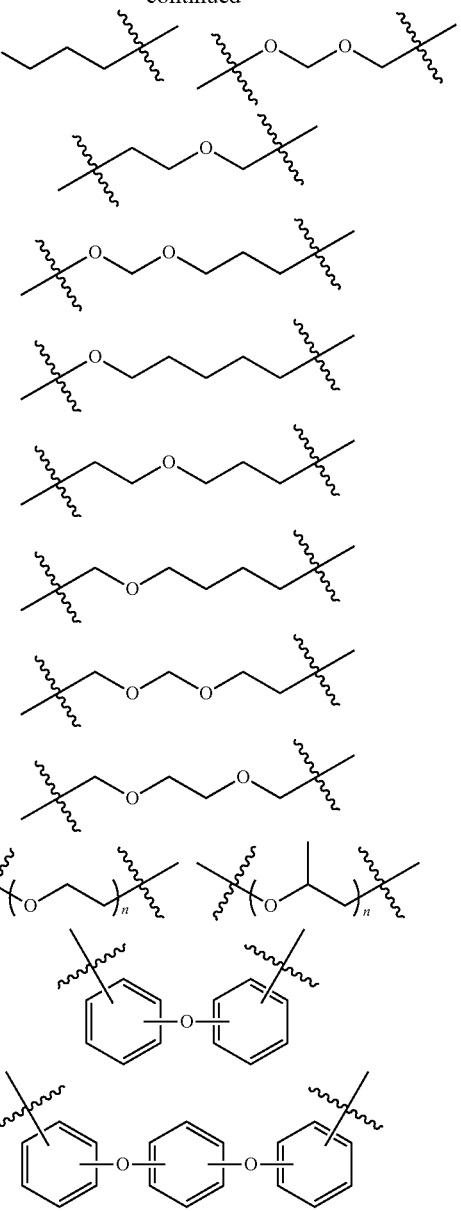

n is a positive integer. In at least one aspect, n is a positive integer and the number average molecular weight (Mn) of the ether is from about 300 to about 500, such as from about 375 to about 450, such as from about 400 to about 425.

In at least one aspect, the hydroxy organosilane is represented by compound 1:

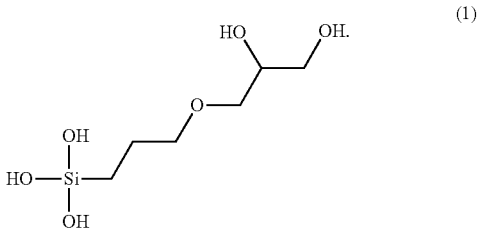 [SMILES: OCC(O)COCCC[Si](O)(O)O]

(1)

Metal alkoxide: A metal alkoxide useful to form sol-gels of the present disclosure provides metal atoms coordinated in a sol-gel for adhesive and mechanical strength. Metal alkoxides of the present disclosure include zirconium alkoxides, titanium alkoxides, hafnium alkoxides, yttrium alkoxides, cerium alkoxides, lanthanum alkoxides, or mixtures thereof. Metal alkoxides can have four alkoxy ligands coordinated to a metal that has an oxidation number of +4. Non-limiting examples of metal alkoxides are zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide.

Corrosion inhibitor: A corrosion inhibitor useful to form sol-gels of the present disclosure provides corrosion resistance of a metal substrate disposed adjacent the sol-gel. Corrosion inhibitors of the present disclosure are compounds having one or more thiol moieties. Metal aircraft surfaces are typically alloys having a major component, such as aluminum, and a minor component, known as an intermetallic. Intermetallics often contain copper metal which is prone to corrosion. Without being bound by theory, it is believed that the interaction of thiol moieties of a corrosion inhibitor of the present disclosure with copper-containing intermetallics on a metal surface (such as an aluminum alloy surface) prevents corrosion of the metal surface. More specifically, interaction of the thiol moieties of a corrosion inhibitor of the present disclosure with the intermetallics blocks reduction of the intermetallics by slowing the rate of oxygen reduction and decreasing oxidation of a metal alloy, such as an aluminum alloy.

Corrosion inhibitors of the present disclosure are organic compounds that can include a disulfide group and/or a thiolate group (e.g., a metal-sulfide bond). In at least one aspect, a corrosion inhibitor is represented by the formula: $R^1—S_n—X—R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, corrosion inhibitors can be polymeric having the formula $—(R^1—S_n—X—R^2)_q—$, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole. Alternatively, each of $R^1$ and $R^2$ is independently selected from H, amino, a phosphorous-containing group, a sulfur-containing group, selenium, or tellurium.

Corrosion inhibitors can include a metal in a metal-thiolate complex. Corrosion inhibitors can include a metal center and one or more thiol groups (ligands) bonded and/or coordinated with the metal center with a metal-sulfide bond.

A thiolate is a derivative of a thiol in which a metal atom replaces the hydrogen bonded to sulfur. Thiolates have the general formula $M-S—R^1$, wherein M is a metal and $R^1$ is an organic group. $R^1$ can include a disulfide group. Metal-thiolate complexes have the general formula $M-(S—R^1)_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

Corrosion inhibitors of the present disclosure include thiadiazoles having one or more thiol moieties. Non-limiting examples of thiadiazoles having one or more thiol moieties include 1,3,4-thiadiazole-2,5-dithiol and thiadiazoles represented by formula (III) or formula (IV):

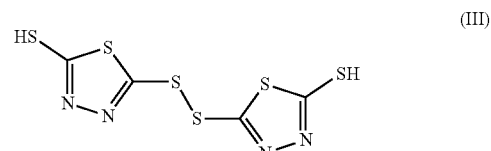

(III)

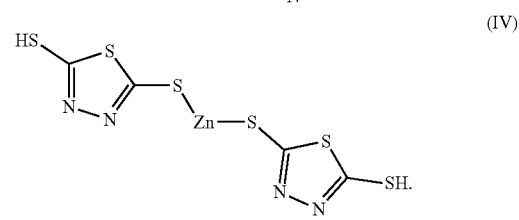

(IV)

The thiadiazole of formula (III) may be purchased from Vanderbilt Chemicals, LLC (of Norwalk, Connecticut) and is known as Vanlube® 829. The thiadiazole of formula (IV) may be purchased from WPC Technologies, Inc.™ (of Oak Creek, Wisconsin) and is known as InhibiCor™ 1000.

Corrosion inhibitors of the present disclosure can also include lanthanide salts. In at least one aspect, a thio-lanthanide salt is a lanthanide (II) salt, lanthanide (III) salt, or lanthanide (IV) salt. Thio-lanthanide salts have a cation and a ligand having one or more sulfur atoms (a "thio-ligand"). The thio-ligand can be neutrally charged or anionic. The number of thio-ligands of the lanthanide salt corresponds to the oxidation state of the cation. For example, a lanthanide (II) salt will have two thio-ligands, a lanthanide (III) salt will have three thio-ligands, and a lanthanide (IV) salt will have four thio-ligands. Lanthanide salts include a cation selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu). For purposes of the present disclosure, a thio-lanthanide salt can include a cation selected from scandium (Sc), yttrium (Y), cobalt (Co), calcium (Ca), strontium (Sr), barium (Ba), and zirconium (Zr). In at least one aspect, a lanthanide is lanthanum (La), cerium (Ce), praseodymium (Pr), or yttrium (Y).

Acid: Suitable acids used to form sol-gels of the present disclosure provides stabilization of a metal alkoxide and a corrosion inhibitor of the sol-gel as well as pH reduction of the sol-gel. The pH value of a sol-gel (and composition that forms the sol-gel) can be controlled by use of an acid. Acids of the present disclosure include organic acids. Organic acids include acetic acid (such as glacial acetic acid) or citric acid. Less acidic acid stabilizers may also be used, such as glycols, ethoxyethanol, or $H_2NCH_2CH_2OH$.

It has been discovered that corrosion inhibitors having thio-moieties have a strong propensity to react with (1) alkoxy moieties of metal alkoxides as well as (2) alkoxy moieties and epoxy moieties of glycidyl trimethoxy silane (GTMS). If the corrosion inhibitor reacts, it is covalently bonded to one or more components of the sol-gel and, accordingly, cannot diffuse through the sol-gel to protect the metal substrate from corrosion.

In at least one aspect, a molar ratio of acid to metal alkoxide is from about 1:1 to about 10:1, such as from about 1:1 to about 6:1, such as from about 3:1 to about 8:1, such as from about 4:1 to about 6:1, such as from about 4:1 to about 5:1.

Without being bound by theory, it is believed that acid in these ratios not only contributes to stabilizing a metal alkoxide for hydrolysis, but also brings the solution to a predetermined pH range that is resistant to corrosion. Accordingly, a corrosion inhibitor of the present disclosure can be solubilized in a first part of a sol-gel system, a second part of the sol-gel system is combined with the first part to form the sol-gel and perform corrosion inhibition at a metal substrate surface. The two part coating prevents the formation of insoluble corrosion inhibitor within the coating system.

If a sol-gel is too acidic or too basic, it may degrade the metal substrate, such as an aluminum substrate. In at least one aspect, a pH of a sol-gel of the present disclosure is from about 3 to about 5, such as about 4.

Hydroxide: Hydroxides of the present disclosure can include any suitable hydroxide. For example, in some aspects, a hydroxide used to form a salt of the corrosion inhibitor includes a metal hydroxide selected from a group consisting of aluminum hydroxide, sodium hydroxide, potassium hydroxide, lithium hydroxide, and any combination thereof. The formation of insoluble corrosion inhibitor is prevented by using a hydroxide to form a salt of the corrosion inhibitor and dissolving the corrosion inhibitor in water. The dissolved salt of the corrosion inhibitor is incorporated into the coating system and the coating system is free of or substantially free of insoluble particles. Other approaches to soluble corrosion resistant sol-gels include lanthanide salts of thiols. The inhibitors of prior approaches are not soluble in water. In the present disclosure, a base, such as hydroxide is used to dissolve the thiol inhibitor. The inhibitor is soluble in a basic solution that deprotonates the thiol.

Any suitable hydroxide can be used to react with the corrosion inhibitor to form a salt of the corrosion inhibitor. The hydroxide can be in a liquid form and can be added to a suspension of the corrosion inhibitor and water. The hydroxide can be added slowly using titration until the suspension is substantially clear or free of cloudy appearance. In some aspects the hydroxide reacts with a thiol to form a thiolate, such as a salt of the thiol. In at least one aspect, a weight fraction of the hydroxide in a solution with the corrosion inhibitor and water is about 0.01 wt % to about 10 wt %, such as about 0.04 wt % to about 0.07 wt %, or about 0.1 wt % to about 1 wt %. The weight fraction of the hydroxide is dependent upon certain properties of the corrosion inhibitor such as a solubility, molecular weight, and acidity (pKa) of the corrosion inhibitor. The weight fraction of the hydroxide by total weight of the solution is determined on a molar basis relative to the thiol to deprotonate the thiol, such that the thiol is fully dissociated.

In at least one aspect, a molar ratio of hydroxide to corrosion inhibitor in the solution is about 0.5:1 to about 2:0.5, such as about 1:1 to about 2:1. In at least one aspect, a molar ratio of the cation metal (of the hydroxide) to the corrosion inhibitor is about 0.5:1 to about 1:1. In some aspects, a molar ratio of the cation metal (of the hydroxide to the corrosion inhibitor for KOH or NaOH is about 1:1. In some aspects, a molar ratio of the cation metal (of the hydroxide to the corrosion inhibitor for $Ca(OH)_2$, $Mg(OH)_2$, or $Ba(OH)_2$ is about 0.5:1.

Corrosion inhibitors, for example, generally have limited solubility in water and aqueous solvents. As used herein, "solubility" refers to an ability to be dissolved in an aqueous solution composed of water in an amount of about 70 wt % or, such as about 80% or more. Corrosion inhibitors may be insoluble powders, insoluble materials (e.g., aggregates, solids, and/or liquids), hydrophobic compounds, heavy oils, and/or greases. Hence, corrosion inhibitors may be solubilized by treating the corrosion inhibitor with a hydroxide to form a salt of the corrosion inhibitor. The salt is capable of dissolving in an aqueous solution, such as in water. The aqueous solution with the salt of the corrosion inhibitor can be uniformly applied onto a substrate to provide corrosion inhibiting benefits. It has been discovered that applying the aqueous solution with the corrosion inhibitor to a surface can be washed off during use which would reduce corrosion resistance. Thus, it has been discovered that an additional coating of a sol-gel component over the corrosion inhibitor (e.g., layer) can protect the corrosion inhibitor from being washed off. Additionally, because the underlying coating is free of or substantially free of insoluble corrosion inhibitor, the resulting coated surface (the sol-gel layer) is free of or substantially free of blistering, provides good corrosion resistance, and provides good adhesion for subsequent layers.

Sol-Gel Systems

FIG. 1 is a side view of a corrosion-inhibiting coating system disposed on a substrate. As shown in FIG. 1, a corrosion-inhibiting coating system 100 comprises a sol-gel coating 102 containing a sol-gel disposed on a metal substrate 104. Sol-gel coating 102 has corrosion inhibiting properties which provide corrosion protection of metal substrate 104. Sol-gel coating 102 promotes adherence between metal substrate 104 and a secondary layer 106. Secondary layer 106 can be a sealant or paint.

Metal substrate 104 can be any suitable material and/or can include any suitable structure that benefits from sol-gel coating 102 being disposed thereon. Metal substrate 104 may define one or more components (such as structural or mechanical components) of environmentally exposed apparatuses, such as aircraft, watercraft, spacecraft, land vehicles, equipment, wind mills, and/or another apparatus susceptible to environmental degradation. Metal substrate 104 can be part of a larger structure, such as a vehicle component. A vehicle component is any suitable component of a vehicle, such as a structural component, such as a panel or joint, of an aircraft, automobile, etc. Examples of a vehicle component include an auxiliary power unit (APU), a nose of an aircraft, a fuel tank, a tail cone, a panel, a coated lap joint between two or more panels, a wing-to-fuselage assembly, a structural aircraft composite, a fuselage body-joint, a wing rib-to-skin joint, an internal component, and/or other component. Metal substrate 104 can be made of aluminum, aluminum alloy, nickel, iron, iron alloy, steel, titanium, titanium alloy, copper, copper alloy, or mixtures thereof. Metal substrate 104 can be a 'bare' substrate, having no plating (unplated metal), conversion coating, and/or corrosion protection between metal substrate 104 and sol-gel coating 102. Additionally or alternatively, metal substrate 104 can include surface oxidation. Hence, sol-gel coating 102 can be directly bonded to metal substrate 104 and/or to a surface oxide layer on a surface of metal substrate 104.

Secondary layer 106 is disposed on a second surface 110 of sol-gel coating 102 opposite first surface 108 of sol-gel coating 102. In at least one aspect, sol-gel coating 102 has a thickness that is less than the thickness of metal substrate 104. In at least one aspect, sol-gel coating 102 has a thickness of from about 1 µm (microns) to about 500 nm, such as from about 5 µm to about 100 nm, such as from about 10 µm to about 100 µm. Thinner coatings may have fewer defects (more likely to be defect free), while thicker coatings may provide more abrasion, electrical, and/or thermal protection to the underlying metal substrate 104.

In at least one aspect, secondary layer 106 includes organic material (e.g., organic chemical compositions) configured to bind and/or adhere to sol-gel coating 102. Secondary layer 106 includes a paint, a topcoat, a polymeric coating (e.g., an epoxy coating, and/or a urethane coating), a polymeric material, a composite material (e.g., a filled composite and/or a fiber-reinforced composite), a laminated material, or mixtures thereof. In at least one aspect, secondary layer 106 includes a polymer, a resin, a thermoset polymer, a thermoplastic polymer, an epoxy, a lacquer, a polyurethane, a polyester, or combinations thereof. Secondary layer 106 can additionally include a pigment, a binder, a surfactant, a diluent, a solvent, a particulate (e.g., mineral fillers), fibers (e.g., carbon, aramid, and/or glass fibers), or combinations thereof.

The sol-gel coating 102 can include a first portion 102A and a second portion 102B. The first and second portion 102A, 102B can be a single sol-gel network, or can be a multi-layer coating. The single sol-gel network is a reaction product of an organosilane, an acid, and a metal alkoxide. The first portion 102A can include a salt of a corrosion inhibitor having one or more thiol moieties. The second portion 102B is free of or substantially free of the salt of the corrosion inhibitor. The second portion 102B can have less than 5 wt %, such as less than 3 wt %, such as less than 1 wt % of the total salt of the corrosion inhibitor by weight of the total sol-gel coating 102.

Methods of Making a Coating System

Previous methods of sol-gel of include mixing a metal alkoxide, acetic acid, and water, followed by stirring. An organosilane is then added to the mixture and stirred again. A corrosion inhibitor is typically added as a dispersion in the sol-gel. Previous sol-gels with corrosion inhibitors dispersed therein, include solid particles of the corrosion inhibitors. Previous sol-gels are deposited to the substrate and cured. Presence of insoluble corrosion inhibitor dispersions within sol-gels, such as corrosion inhibitors with thiols, can disrupt the sol-gel network due to the thiol reactivity. If the sol-gel network is disrupted, the resulting coating can have reduced adhesiveness.

Figure 2:
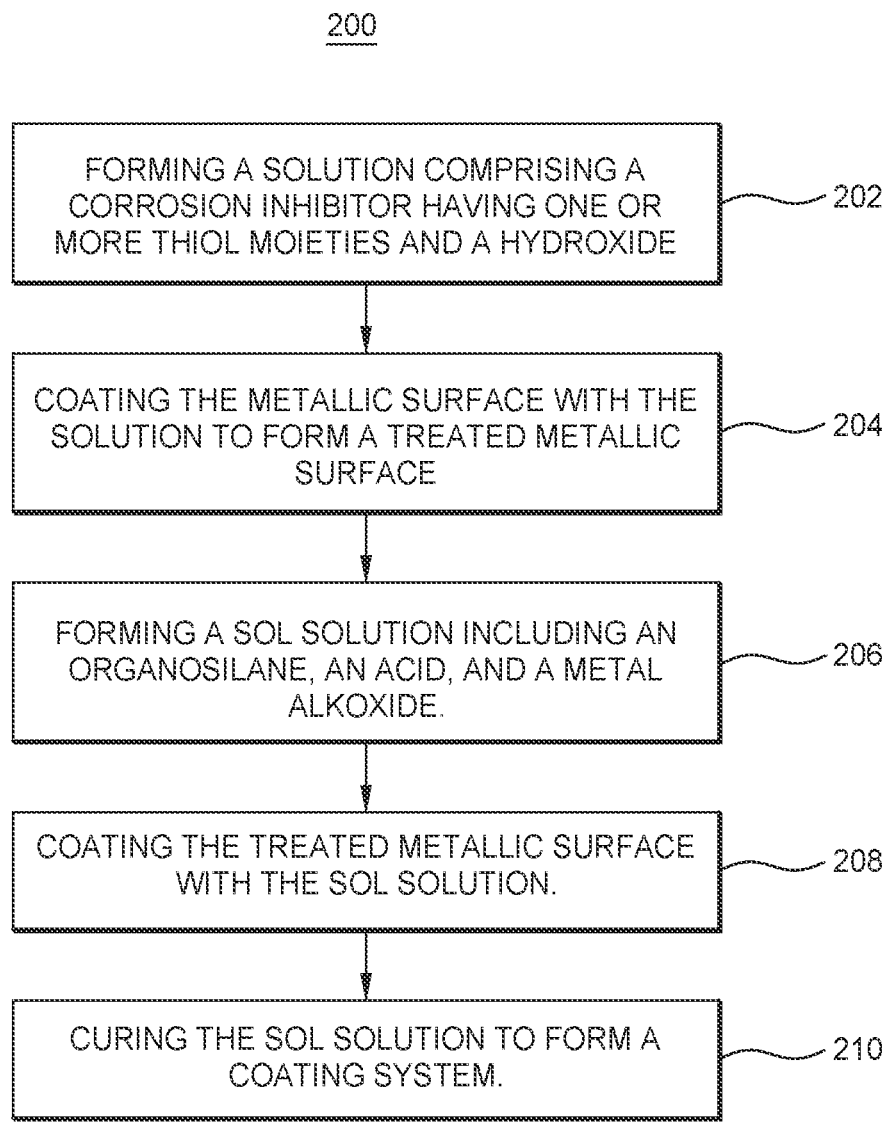
FIG. 2 is a flow chart illustrating a method of forming a coating system, in accordance with some examples of the present disclosure.

FIG. 2 is a flow chart illustrating a method 200 of forming a coating system by treating a metallic surface with a salt of a corrosion inhibitor and coating the treated metallic surface with a sol solution to form a sol-gel coating 102. As shown in FIG. 2, the first portion of the sol-gel coating 102A can be formed by forming 202 a solution of a corrosion inhibitor and a hydroxide. The corrosion inhibitor has one or more thiol moieties and can be introduced (e.g., by dispersing, emulsifying, suspending, and/or dissolving) in an aqueous solution, such as water. The corrosion inhibitor can be the form of a solid, an aggregate, and/or a powder prior to introducing the corrosion inhibitor to the water to form the dispersion. The dispersion has a cloudy appearance due to the solid corrosion inhibitor particles suspended in the dispersion. The dispersion can be continuously stirred for about 1 minute to about 24 hours, such as about 10 minutes to about 1 hour. The dispersion can be stirred at a temperature of about 20° C. to about 100° ° C. at about 760 torr. The dispersion can be mixed with a high-shear mixer (e.g., a paint shaker or a planetary-centrifugal mixer or stirrer). A high-shear mixer may be advantageous to break and/or to finely disperse solids to form a uniform mixture or a substantially uniform mixture. For example, a high-shear mixer can dissolve, suspend, emulsify, disperse, homogenize, deagglomerate, and/or disintegrate solids into the dispersion.

A hydroxide is added to the dispersion slowly such as by titration until the appearance of the solution is clear. Alternatively, the hydroxide is added until a predetermined weight fraction or pH is achieved. A weight fraction of the corrosion inhibitor in the solution is about 0.1 wt % to about 50 wt %, such as about 0.2 wt % to about 40 wt %, such as about 0.5 wt % to about 35 wt %, such as about 1 wt % to about 30 wt %, such as about 2 wt % to about 25 wt %, such as about 3 wt % to about 20 wt %. The weight fraction of corrosion inhibitor in the coating system is about 0.01 wt % to about 5 wt %, such as about 0.1 wt % to about 5 wt %. Adding too much corrosion inhibitor causes osmotic blistering and adding too little does not provide adequate corrosion protection.

In some aspects, a hydroxide includes a metal hydroxide selected from a group consisting of aluminum hydroxide, sodium hydroxide, potassium hydroxide, lithium hydroxide, calcium hydroxide, magnesium hydroxide, or barium hydroxide, and any combination thereof. It has been discovered that the hydroxide reacts with the corrosion inhibitor to form a salt of the corrosion inhibitor. For example, the salt of the corrosion inhibitor can be an aluminum salt, a sodium salt, a potassium salt, a lithium salt, or any combination thereof. The salt of the corrosion inhibitor is soluble in an aqueous solution such as in water, such as deionized water. The hydroxide is added in an amount capable of solubilizing the corrosion inhibitor while maintaining a solution pH of about 4 pH to about 9 pH, such as about 6 pH to about 7 pH. Adding too much hydroxide or not enough hydroxide moves the pH too low or too high, such that corrosion of aluminum is accelerated.

A weight fraction of the hydroxide in the solution is about 0.01 wt % to about 10 wt %, such as about 0.04 wt % to about 0.07 wt %, or about 0.1 wt % to about 1 wt %.

The method 200 includes coating 204 the metallic surface with the solution to form a treated metallic surface. The treated metallic surface forms a first portion of the sol-gel coating 102A. The treated metallic surface can be at least partially cured at pressure of about 760 Torr to about 3 Torr, such as about 600 Torr to about 1 Torr, and a temperature of about 10° C. to about 150° C., such as about 20° ° C. to about 80° C., or about 100° C. to about 120° C. Curing at a temperature that is too high causes the metal to lose temper and thus strength, such as tensile yield strength of aluminum alloy. A temperature that is too low will not adequately cure the treated metallic surface.

The treated metallic surface is cured for about 0.01 hours to about 72 hours, such as about 1 hour to about 12 hours, such as about 2 hours to about 6 hours.

In at least one aspect, coating 204 includes cleaning and/or pretreating metal substrate 104 before wetting the metallic surface with the solution. Generally, sol-gel coating 102 adheres and/or bonds better with a clean, bare metal substrate, free from dirt or substantially free from dirt, surface oxides, and/or insoluble corrosion products. Because the first portion 102A of the sol-gel coating is free of insoluble corrosion inhibitors or substantially free of insoluble corrosion inhibitors, the second portion 102B adheres to the first portion 102A of the sol-gel coating. In some aspects, the second portion 102B is applied to the first portion 102A without treating, such as rinsing, the first portion 102A. Cleaning can include degreasing, an alkaline wash, chemical etching, chemically deoxidizing, and/or mechanically deoxidizing (e.g., sanding and/or abrading). Coating 204 optionally includes coating metal substrate 104 with an undercoating or forming a chemical conversion coating on metal substrate 104. Alternatively, in some aspects, coating 204 includes directly coating the (bare) metal substrate 104.

In at least one aspect, coating 204 includes rinsing the treated metallic surface 102A after at least partially curing the treated metallic surface 102A. Rinsing includes water rinsing followed by air drying. Alternatively, rinsing includes sulfuric rinsing, followed by water rinsing, followed by air drying. Coating 204 the metallic surface comprises spraying, dip coating, or a combination thereof.

Forming 206 a sol solution includes combining sol solution components including an organosilane, an acid, and a metal alkoxide. Combining the sol solution components includes mixing the components in amounts and/or ratios sufficient to provide an active sol solution that may react to form the sol-gel. Mixing includes mixing the sol-gel components to form the sol solution (e.g., a mixture, an emulsion, a suspension, and/or a colloid). In at least one aspect, mixing includes mixing all sol-gel components together concurrently. Alternatively, mixing includes mixing any two components (e.g., metal alkoxide and acid) to form a first mixture and then mixing the remaining components into the first mixture to form a second mixture.

Generally mixing includes mixing two or more sol-gel components to form the sol solution. The sol-gel components can be dilute to control self-condensation reactions and thus increase the pot life of the mixed sol solution. Mixing includes mixing to form a mixture and the weight fraction (wt %) of (metal alkoxide+organosilane+acid) in the mixture is about 0.3 wt % to about 50 wt %, such as about 1 wt % to about 45 wt %, such as about 2 wt % to about 40 wt %, such as about 3 wt % to about 35 wt %, such as about 4 wt % to about 25 wt %, such as about 8 wt % to about 22 wt %. The weight fraction of (metal alkoxide+organosilane+acid) in the mixture is determined to provide good gel formation.

In at least one aspect, a molar ratio of acid to metal alkoxide is about 1:1 to about 40:1, such as about 3:1 to about 8:1, such as about 4:1 to about 6:1, such as about 4:1 to about 5:1.

The mixture of sol-gel components can be incubated for a period of time, such as from about 1 minute to about 60 minutes, such as from about 5 minutes to about 30 minutes, such as from about 10 minutes to about 20 minutes. Furthermore, pot-life is the period of time from the mixing until the sol-gel is formed (e.g., the mixture becomes too viscous to be usable). The pot life can be from about 1 hour to about 24 hours, such as from about 2 hours to about 8 hours, such as about 4 hours. Incubating may be performed under ambient conditions (e.g., at about 20° C. to about 23° C.) and/or at elevated temperature. Suitable incubation temperatures include from about 10° C. to about 100° C., such as from about 20° C. to about 70° C., such as from about 30° C. to about 50° C., for example about 40° C.

Coating 208 the treated metallic surface 102A with the sol solution forms a second portion of sol-gel coating 102B of the sol-gel coating 102. Coating 208 the metallic surface at least partially reacts with the first portion of the sol-gel coating 102A to form the sol-gel coating 102.

Incubating includes, after mixing the mixture comprising sol-gel components, allowing the sol solution including sol-gel components to stand at room temp for 30 minutes or more. Coating 208 can include wetting the treated metal substrate 102A with a sol solution comprising sol-gel components, for example, by spraying, immersing, brushing, and/or wiping the mixture comprising sol-gel components onto treated metal substrate 102A. For example, suitable forms of spraying include spraying with a spray gun, high-volume, low-pressure spray gun, and/or hand pump sprayer. Coating 208 the treated metallic surface includes spraying, dip coating, or a combination thereof.

The sol solution of sol-gel components is drained from the wetted treated metal substrate 102A for a few minutes (e.g., 1-30 minutes, 1-10 minutes, or 3-10 minutes) and, if necessary, excess, undrained mixture may be blotted off the treated metal substrate 102A and/or gently blown off the treated metal substrate 102A by compressed air.

In at least one aspect, methods of the present disclosure include curing a sol solution to form a coating system. As shown in FIG. 2, curing 210 can include drying sol solution disposed on the treated metal substrate 102A and may be performed under ambient conditions (e.g., less than 20° C.), at room temperature (e.g., about 20° C. to about 23° C.), and/or at elevated temperature (e.g., greater than 23° C.). In at least one aspect, a curing temperature is from about 10° C. to about 150° C., such as from about 20° C. to about 100° C., such as from about 30° C. to about 70° C., such as from about 40° C. to about 50° C. Cure temperatures that are below the disclosed temperatures can use cure times that are too long, or may not adequate cure the sol solution dispose don the treated metal substrate 102A. Cure temperatures that are too high can potentially boil off water before the gel and form voids and defects in the coating. Curing 210 can be performed for a period of time, such as from about 1 minute to about 48 hours, such as from about 5 minutes to about 24 hours, such as from about 10 minutes to about 8 hours, such as from about 30 minutes to about 4 hours, for example about 1 hour. Curing 210 can be at a pressure of about 760 Torr to about 3 Torr, such as about 600 Torr to about 1 Torr.

After coating 208 and/or curing 210, the sol-gel is suitable for exposure to an external environment and/or for application of a secondary layer 106. Depositing 210 a secondary layer 106 of organic material can be performed before curing 210 is completely finished, for example, depositing a secondary layer 106 is performed at least partially concurrently with curing 210. Depositing can include painting, spraying, immersing, contacting, adhering, and/or bonding sol-gel coating 102 with the organic material to form secondary layer 106. A secondary layer includes a paint, a fiber-reinforced plastic, or other suitable organic material. Depositing a secondary layer onto the coating system forms a coated coating system.

FIG. 3 is a flow chart illustrating a method 300 of forming a coating system including treating a metallic surface with a salt of a corrosion inhibitor and a first part of a sol-gel system and coating the treated metallic surface with a second part of a sol-gel system.

As shown in FIG. 3, the first portion of the sol-gel coating 102A can be formed by forming 302 a solution of a corrosion inhibitor and a hydroxide in the same manner as operation 202 of FIG. 2 to form the same solution described with reference to FIG. 2. Forming 302 the solution includes combining 302A the corrosion inhibitor, the hydroxide, the acid, and the metal alkoxide, and coating 302B the metallic surface with the solution.

The method 300 includes coating 304 the metallic surface 104 with the solution in the same manner described in operation 204 with reference to FIG. 2. Coating the metallic surface 104 further includes applying an acid and a metal alkoxide to the metallic surface 104 to form a treated metallic surface 102A. Coating the metallic surface 102 with the solution, the acid, and the metal alkoxide can be done in a single coating process. The single coating process includes combining the acid and metal alkoxide to the solution prior to applying to the metallic surface 104. The combined solution can have a pH of about pH of about 3 to about 5, such as about 3.5 to about 4.5. Alternatively, applying 304A the solution over the metallic surface 104 is followed by applying 304B the acid and the metal alkoxide after applying the solution. The acid and metal alkoxide can be combined to form a first part of a sol-gel. The first part of the sol-gel further includes alcohol such as propyl alcohol. The treated metallic surface 102A can be at least partially cured in substantially the same manner as curing the treated metallic surface 102A described with reference to FIG. 2.

Coating 306 the treated metallic surface 102A with an organosilane, such as a second part of a sol-gel solution is shown in FIG. 1. The organosilane can be in a organosilane containing solid. A weight fraction of organosilane in the organosilane containing solid is greater than about 50 wt %, such as greater than 90 wt %, such as about 98 wt % to about 99.9 wt %. The organosilane containing solid includes a weight fraction of an alcohol, such as an alkyl alcohol, such as methyl alcohol of less than about 5 wt %, such as about 0.1 wt % to about 1 wt %. The organosilane containing solid is dissolved in a solvent, such as a propanol, such as isopropanol, to form the second part of the sol-gel solution. The organosilane to propanol weight ratio is about 1:20 to about 3:5, such as about 1:10 to about 1:5. Curing 308 the second part of the sol-gel solution forms a coating system of the present disclosure. The second part of the sol-gel solution reacts with the first part of sol-gel solution on the treated metallic surface 102A to form a sol-gel coating 102 on the metallic surface 104. Any suitable method of curing described herein can be used to cure the second part of the sol-gel solution, such as the curing described with reference to operation 210 shown in FIG. 2.

It has been discovered that applying a solution including a salt of a corrosion inhibitor separately on a metallic surface from one or more parts of a sol-gel prevents corrosion inhibitor from precipitating out of the sol-gel solution to provide a uniform coating system that is substantially free of insoluble corrosion inhibitor, free of blistering when applied to metallic surfaces, provides good adhesion, and provides good corrosion resistance. Heavy metals, such as chromium, present in the sol-gel are merely optional.

Examples

Experimental: Materials: AC-131 CB 1 AT kit was obtained from 3M. AC-131 is a non-chromate conversion coating for use on aluminum, nickel, stainless steel, magnesium, and titanium alloys. AC-131 has a Part A, which is an aqueous mixture of acetic acid and Zirconium n-propoxide, summarized in Table 1 and a Part B, which includes organosilane, summarized in Table 2.

TABLE 1

Formulation of Part A of AC-131 solutions.

| Ingredient | Water | Zirconium n-propoxide | Acetic Acid | Propyl Alcohol |
|---|---|---|---|---|
| wt % | 98-99 | <1 | <0.5 | <0.5 |

TABLE 2

Formulation of Part B of AC-131 solutions.

| Ingredient | 3-(trimethyoxysilyl)propyl glycidyl ether | Methyl alcohol |
|---|---|---|
| wt % | 99-99.9 | 0.1-1 |

Formulation 1 (solubilized DMcT solution): 2.0 grams of 2,5-dimercapto-1,3,4-thiadiazole (DMcT) was dispersed in 196.3 grams of water. The DMcT dispersion was solubilized by adding potassium hydroxide (KOH) to the dispersion incrementally while monitoring the pH. The pH and visual results are shown in Table 3. Prior to adding KOH, the DMcT dispersion had a cloudy appearance and a pH of 1.029. The pH increased as additional KOH was added by titration. After adding 0.94 grams of KOH, the dispersion transitioned from a cloudy appearance to a clear yellow with a pH of 6.447 pH.

TABLE 3

Solubilization of DMcT with KOH

| Grams KOH | pH | Observation |
|---|---|---|
| 0 | 1.029 | cloudy |
| 0.698 | 1.873 | cloudy |
| 0.813 | 2.678 | cloudy |
| 0.94 | 6.447 | clear yellow |

Formulation 2 (Part A of sol-gel): A second dispersion of DMCT in water (2.0 grams in 200 mL) was solubilized by adding 0.902 grams of KOH to the dispersion. The final pH of the clear yellow solution was 6.259. 200 mL of Part A (e.g., composition summarized in Table 1) was added to the 200 ml of DMcT solution. The solution remained clear and had a final pH of 3.922 pH.

Formulation 3 (Part B of sol-gel in isopropanol): 20.0 g of Part B (e.g., composition summarized in Table 2) was dissolved in 70.0 grams of isopropanol yielding a clear, colorless solution.

Boegel: Part A and Part B from 3M™ Surface Pre-Treatment AC-131 were combined to form Boegel in accordance with the manufacturing instructions.

RESULTS AND DISCUSSION

When Part B was added directly to Part A containing soluble DMCT, a precipitate immediately formed. Without being bound by theory, it is believed that the 3-(trimethoxysilyl)propyl glycidyl ether reacted with the DMCT due to the reaction of the thiol functionality with the epoxy.

Six clean 2024-T3 AA panels were spray coated with various formulations and sequences as shown in Table 4. ASM aerospace specification metals 2024 is a high strength aluminum alloy tempered to T3.

TABLE 4

Corrosion Results

| Panel No. | Pretreatment | Post Treatment | Coating | Observation |
|---|---|---|---|---|
| 1 | Formulation 1 | Air Dry | Boegel | No Visible Corrosion |
| 2 | Formulation 1 | Air Dry, Water Rinse, Air Dry | Boegel | Visible Corrosion |
| 3 | Formulation 1 | Air Dry, Sulfuric Rinse, Water Rinse, Air Dry | Boegel | Visible Corrosion |
| 4 | Formulation 2 | Air Dry | Formulation 3 | Visible Corrosion |
| 5 | Formulation 2 | Air Dry | Boegel | No Visible Corrosion |
| 6 | Formulation 2 | Air Dry | Formulation 3 | Visible Corrosion |

Each of the panels were exposed to a neutral salt fog for 24 hours in accordance with ASTM B117-19 (2019). Panels 1 and 5 showed minimal to no visible signs of corrosion after 24 hours of exposure to the neutral salt fog. For panels 2 and 3, it is believed that the rinsing post treatment removed the DMCT from the metallic surface resulting in reduced corrosion resistance. Or panels 4 and 6, it is believed that Formulation 3 did not enable sufficient reaction with Formulation 2 to form a coherent gel network.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Definitions

The term "alkyl" includes a substituted or unsubstituted, linear or branched acyclic alkyl radical containing from 1 to about 20 carbon atoms. In at least one aspect, alkyl is a $C_{1-10}$alkyl, $C_{1-7}$alkyl or $C_{1-5}$alkyl. Examples of alkyl include, but are not limited to, methyl, ethyl, propyl, butyl, pentyl, hexyl, heptyl, octyl, nonyl, decyl, and structural isomers thereof.

The term "cycloalkyl" includes a substituted or unsubstituted, cyclic alkyl radical containing from 3 to about 20 carbon atoms.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO— wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

The term "hydroxy" refers to —OH.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

ADDITIONAL ASPECTS

Clause 1. A method of coating a metallic surface, comprising: forming a solution comprising a corrosion inhibitor having one or more thiol moieties and a hydroxide; coating the metallic surface with the solution to form a treated metallic surface; and coating the treated metallic surface with an organosilane, an acid, and a metal alkoxide to form a coating system.

Clause 2. The method of Clause 1, wherein the solution further comprises the acid and the metal alkoxide.

Clause 3. The method of Clauses 1 or 2, wherein the solution has a pH of about 3.5 to about 4.5.

Clause 4. The method of any of Clauses 1 to 3, wherein the hydroxide is selected from a group consisting of aluminum hydroxide, sodium hydroxide, potassium hydroxide, lithium hydroxide, and any combination thereof.

Clause 5. The method of any of Clauses 1 to 4, wherein the solution has a pH of about 6 to about 7.

Clause 6. The method of any of Clauses 1 to 5, further comprising curing the treated metallic surface at about 10° C. to about 50° C. at a pressure of about 760 Torr to about 1 Torr.

Clause 7. The method of any of Clauses 1 to 6, wherein the acid is acetic acid.

Clause 8. The method of any of Clauses 1 to 7, wherein: coating the metallic surface comprises spraying, dip coating, or a combination thereof; and coating the treated metallic surface comprises spraying, dip coating, or a combination thereof.

Clause 9. The method of any of Clauses 1 to 8, further comprising depositing a secondary layer onto the coating system to form a coated coating system.

Clause 10. The method of any of Clauses 1 to 9, wherein a weight fraction of the hydroxide in the solution is about 0.1 wt % to about 10 wt %.

Clause 11. A method of coating a metallic surface, comprising: forming a solution comprising a corrosion inhibitor having one or more thiol moieties, and a hydroxide; coating the metallic surface with the solution, an acid, and a metal alkoxide to form a treated metallic surface; and coating the treated metallic surface with a coating comprising an organosilane to form a coating system.

Clause 12. The method of Clause 11, wherein coating the metallic surface the coating further comprises: applying the solution over the metallic surface; and applying an acid and a metal alkoxide after applying the solution.

Clause 13. The method of Clause 11 or 12, wherein forming the solution comprises combining the corrosion inhibitor, the hydroxide, the acid, and the metal alkoxide; and coating the metallic surface with the solution.

Clause 14. A coating system comprising a reaction product of a salt of a corrosion inhibitor having one or more thiol moieties, an organosilane, an acid, and a metal alkoxide.

Clause 15. The coating system of Clause 14, wherein the organosilane is a organosilane represented by Formula (I):

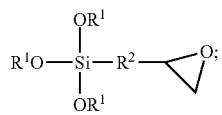

(I)

wherein: each $R^1$ is independently selected from $C_1$-$C_{20}$ alkyl; and $R^2$ is selected from a group consisting of alkyl, cycloalkyl, ether, and aryl.

Clause 16. The coating system of Clauses 14 or 15, wherein the organosilane is represented by Formula (II):

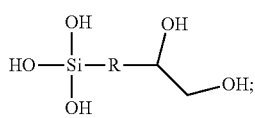

(II)

wherein R is selected from a group consisting of alkyl, cycloalkyl, ether, and aryl.

Clause 17. The coating system of Clause 16, wherein R is ether selected from a group consisting of polyethylene glycol ether, polypropylene glycol ether, $C_1$-20 alkyl ether, aryl ether, and cycloalkyl ether.

Clause 18. The coating system of any of Clauses 14 to 17, wherein the metal alkoxide is selected from a group consisting of zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, and any combination thereof.

Clause 19. The coating system of any of Clauses 14 to 18, wherein a molar ratio of acid to metal alkoxide in the coating system is about 1:1 to about 6:1.

Clause 20. The coating system of any of Clauses 14 to 19, wherein the acid is acetic acid.

Clause 21. The coating system of any of Clauses 14 to 20, wherein the corrosion inhibitor is represented by the formula: $R^1$—Sn—X—$R^2$, wherein $R^1$ is an organic group, n is a positive integer, X is a sulfur or a metal atom, and $R^2$ is an organic group.

Clause 22. The coating system of any of Clauses 14 to 21, wherein the corrosion inhibitor is a thiadiazole having one or more thiol moieties.

Clause 23. The coating system of any of Clauses 14 to 22, wherein the corrosion inhibitor is represented by formula (III) or formula (IV):

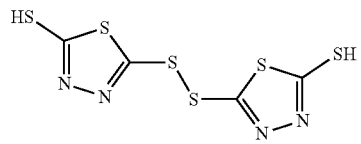

(III)

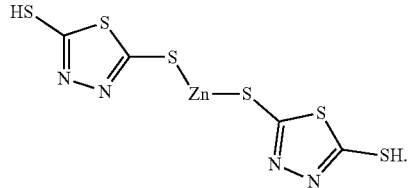

(IV)

Clause 24. The coating system of any of Clauses 14 to 23, wherein a weight fraction of corrosion inhibitor in the coating system is about 0.01 wt % to about 5 wt %.

Clause 25. A vehicle component comprising: a metal substrate; and the coating system of any of Clauses 14 to 25.

Clause 26. The vehicle component of clause 25, wherein the metal substrate is selected from a group consisting of aluminum, nickel, iron, steel, titanium, copper, alloys thereof, and any combination thereof.

Clause 27. The vehicle component of Clause 25, further comprising an epoxy coating or urethane coating over the coating system.

Clause 28. The vehicle component of Clause 25, wherein the vehicle component is selected from a group consisting of an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, an internal component, and any combination thereof.

While we have described preferred aspects, those skilled in the art will readily recognize alternatives, variations, and modifications which might be made without departing from the inventive concept. Therefore, interpret the claims liberally with the support of the full range of equivalents known to those of ordinary skill based upon this description. The examples illustrate the present disclosure and are not intended to limit it. Accordingly, define the present disclosure with the claims and limit the claims only as necessary in view of the pertinent prior art.

What is claimed is:
1. A method of coating a metallic surface, comprising:
dispersing, using a high-shear mixer, a corrosion inhibitor having one or more thiol moieties in an aqueous solution;
subsequently forming a salt of the corrosion inhibitor in the aqueous solution by mixing the aqueous solution with a hydroxide with a molar ratio to the corrosion inhibitor of 0.5:1 to about 4:1 until the thiol moieties are depronated and a weight of the hydroxide remains less than 10 percent of a weight of the aqueous solution;
dissolving the salt until the aqueous solution becomes a solution free of insoluble particles;
subsequently coating the metallic surface with the solution free of insoluble particles, an acid, and a metal alkoxide to form a treated metallic surface;
partially curing, on the metallic surface, the solution free of insoluble particles; and
subsequently coating the treated metallic surface with a coating comprising an organosilane to form a coating system.
2. The method of claim 1, wherein coating the metallic surface the coating further comprises:
applying the solution free of insoluble particles over the metallic surface;
partially curing the solution free of insoluble particles between 20-23 degrees Celsius; and applying the acid and the metal alkoxide after applying the solution free of insoluble particles.

3. The method of claim 1, wherein the solution free of insoluble particles comprises a pH between 4 and 9.

4. The method of claim 1, the method further comprising curing the treated metallic surface at a pressure of about 760 Torr to about 3 Torr and a temperature of about 10° C. to about 50° C. to a thickness between 10 microns and 100 microns.

5. The method of claim 4, the method further comprising curing the coating system at a pressure of about 760 Torr to about 3 Torr and a temperature of about 10° C. to about 50° C.

6. The method of claim 1, the method further comprising curing the coating system at a pressure of about 760 Torr to about 3 Torr and a temperature of about 10° C. to about 50° C.

7. The method of claim 1, further comprising determining an amount of the hydroxide on a molar basis relative the thiol moieties.

8. The method of claim 1, wherein the coating further comprises an alcohol.

9. The method of claim 8, wherein the alcohol is an alkyl alcohol.

10. The method of claim 9, wherein the alcohol is methyl alcohol.

11. The method of claim 1, wherein the hydroxide is selected from a group consisting of aluminum hydroxide, sodium hydroxide, potassium hydroxide, lithium hydroxide, and any combination thereof.

12. The method of claim 1, wherein the organosilane is represented by Formula (I):

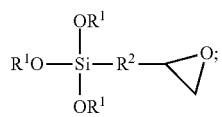

(I)

wherein:

each $R^1$ is independently selected from C1-C20 alkyl; and $R^2$ is selected from a group consisting of alkyl, cycloalkyl, ether, and aryl.

13. The method of claim 1, wherein the organosilane is represented by Formula (II):

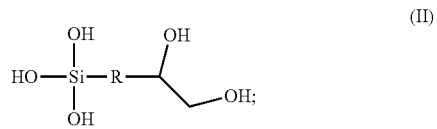

(II)

wherein R is selected from a group consisting of alkyl, cycloalkyl, ether, and aryl.

14. The method of claim 13, wherein R is ether selected from a group consisting of polyethylene glycol ether, polypropylene glycol ether, $C_{1-20}$ alkyl ether, aryl ether, and cycloalkyl ether.

15. The method of claim 1, wherein the metal alkoxide is selected from a group consisting of zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, and any combination thereof.

16. The method of claim 1, wherein a molar ratio of acid to metal alkoxide is about 2:1 to about 6:1.

17. The method of claim 1, wherein the acid is acetic acid.

\* \* \* \* \*